US012606326B1

(12) United States Patent
Perritt, Jr.

(10) Patent No.: US 12,606,326 B1
(45) Date of Patent: Apr. 21, 2026

(54) UNMANNED AERIAL VEHICLE WITH INTEGRATED PAINTBALL PROJECTILE SYSTEM AND METHOD FOR USE

(71) Applicant: Henry Hardy Perritt, Jr.,
Charlottesville, VA (US)

(72) Inventor: Henry Hardy Perritt, Jr.,
Charlottesville, VA (US)

( * ) Notice: Subject to any disclaimer, the term of this
patent is extended or adjusted under 35
U.S.C. 154(b) by 0 days.

(21) Appl. No.: 19/335,213

(22) Filed: Sep. 22, 2025

(51) Int. Cl.
| *B64U 40/20* | (2023.01) |
| *B64U 10/14* | (2023.01) |
| *B64U 101/18* | (2023.01) |

(52) U.S. Cl.
CPC .............. *B64U 10/14* (2023.01); *B64U 40/20*
(2023.01); *B64U 2101/18* (2023.01); *B64U*
*2201/20* (2023.01)

(58) Field of Classification Search
CPC ........ B64U 10/00; B64U 10/13; B64U 10/14;
B64U 40/20; B64U 2101/18; B64U
2201/20; F41B 11/80
See application file for complete search history.

(56) References Cited

U.S. PATENT DOCUMENTS

| 7,270,121 | B2 | 9/2007 | Lubben | |
| 8,176,908 | B2 | 5/2012 | Dobbins | |
| 11,719,504 | B1 * | 8/2023 | Kopman | .................. F41B 11/54 |
| | | | | 124/78 |

| 2008/0105245 | A1 | 5/2008 | Cole | |
| 2010/0300420 | A1 | 12/2010 | Nelson | |
| 2024/0150018 | A1 * | 5/2024 | Trenshaw | .............. B64U 10/13 |

FOREIGN PATENT DOCUMENTS

| WO | WO-2016181426 A1 * | 11/2016 | .............. F41B 11/70 |
| WO | WO-2022019749 A1 * | 1/2022 | .............. B64U 10/13 |
| WO | WO-2022256885 A1 * | 12/2022 | .............. F41B 11/85 |
| WO | WO-2023205564 A1 * | 10/2023 | .............. F41B 11/80 |
| WO | WO-2024009062 A1 * | 1/2024 | .............. F41A 27/08 |
| WO | WO-2024191323 A1 * | 9/2024 | ................ F42B 5/05 |

* cited by examiner

*Primary Examiner* — John E Simms, Jr.
(74) *Attorney, Agent, or Firm* — Henry H. Perritt, Jr.

(57) ABSTRACT

An unmanned quadcopter aircraft system integrated with a
pneumatic paintball projectile launching mechanism for
recreational and training applications. The system includes a
compressed gas powered single-shot paintball launcher with
gravity-fed ammunition hopper, mechanical counterweight
recoil compensation, and multiple electronic safety systems.
GPS-based geofencing prevents firing in restricted zones,
while altitude sensors prevent firing above predetermined
heights. The flight control system automatically reduces
aircraft speed and altitude limits when the projectile system
is armed. A ground control system integrates standard flight
controls with firing controls, safety indicators, and emer-
gency stop capability. An alternative embodiment allows a
used to adjust the elevation of the firing system while
maintaining the orientation of the drone in space and also
allowing recoil compensation. The system enables aerial
paintball gaming and training scenarios while maintaining
safety through redundant control systems and automatic
parameter limiting.

18 Claims, 11 Drawing Sheets

MOTOR CONTROLLERS <u>402</u>     FLIGHT CONTROL PROCESSOR <u>404</u>     SAFETY MODULE <u>406</u>

GPS RECEIVER <u>408</u>     ALTIMETER <u>410</u>     GEOFENCING TEMPLATES <u>412</u>     IMU <u>414</u>

GROUND CONTROL SUBSYSTEM <u>416</u>     FIRING CONTROL <u>418</u>     SOLENOID <u>420</u>

1132

GROUND CONTROL SUBSYSTEM 416

FIRST FLIGHT CONTROL 1104

1114     1116

SECOND FLIGHT CONTROL 1106

1112

1124     1120

MOVING MAP 1118

1126

VIDEO DISPLAY 1108

1136

UNMANNED AERIAL VEHICLE WITH INTEGRATED PAINTBALL PROJECTILE SYSTEM AND METHOD FOR USE

BACKGROUND

Field of the Invention

The present disclosure relates to unmanned aerial vehicles (UAVs), and more specifically to a quadcopter drone system integrated with a pneumatic paintball projectile launching mechanism, altitude-based safety controls, and GPS-restricted firing zones for recreational and training applications.

Background of the Invention

Unmanned aerial vehicles (UAVs), particularly quadcopter aircraft, have become widely commercially available with standardized components and established performance characteristics. Commercial quadcopter platforms typically include four brushless electric motors, electronic speed controllers (ESCs), flight control processors with GPS and inertial measurement units, radio control transceivers, and rechargeable battery systems. These components are well-known in the art and readily available from numerous manufacturers.

Representative commercial quadcopter systems include the DJI Phantom series, Autel EVO series, and various open-source platforms such as those based on ArduPilot or PX4 flight control software. Such systems typically feature payload capacities of 100-1000 grams, flight times of 10-30 minutes, and control ranges of 1-5 kilometers.

Current paintball systems are limited to ground-based platforms, restricting tactical scenarios and training applications. Existing drone-based payload delivery systems focus on passive cargo rather than active projectile deployment. Prior art includes various drone-mounted devices, but none specifically address the unique challenges of mounting a paintball system on a small quadcopter platform while maintaining flight stability, safety, and accuracy.

Paintball projectiles and systems for launching them are in wide use for recreational purposes and, to a limited extent, for training of military and law enforcement personnel. Drones increasingly are used in military and law-enforcement applications, necessitating the training of personnel in their use. Existing paintball systems can be used only on the ground. A need exists for aerial paintball systems that can simulate a variety of operational drone systems.

Also, law enforcement situations exist, in which is desirable to mark suspects for later arrest or interrogation in the context of crowd control, robberies, or other hot pursuits. Often this is infeasible to do safety with present ground-based methods.

Recreational users of paintball systems often are recreational drone users, but there currently is no convenient way for them to combine these hobbies.

The prior art fails to address several critical technical challenges: (1) recoil management during projectile firing that can destabilize small aircraft, (2) weight distribution of pneumatic systems on weight-sensitive platforms, (3) altitude and location-based safety controls specific to projectile-firing aircraft, and (4) integration of firing controls with existing UAV flight control systems.

A critical technical challenge in drone-mounted pneumatic projectile systems is preventing gas backflow through the ammunition feed system during firing. When the firing chamber is pressurized, gas will follow the path of least resistance to atmospheric pressure. Without countermeasures, gas would preferentially escape backward through the feed tube rather than forward through the barrel, significantly reducing projectile velocity and system efficiency.

BRIEF SUMMARY OF THE INVENTION

The present invention provides an unmanned quadcopter aircraft integrated with a pneumatic paintball projectile system, featuring advanced safety controls, recoil compensation, firing elevation adjustment, and intelligent firing restrictions. The system combines traditional quadcopter flight capabilities with a novel paintball launching mechanism specifically designed for aerial deployment.

The invention includes a quadcopter frame mounting four rotors with a centrally mounted pneumatic firing system. A compressed gas cartridge powers a single-shot paintball launcher with gravity-fed ammunition hopper. The system incorporates multiple safety features including altitude-based firing lockouts, GPS-restricted zones, and automatic flight parameter adjustments when armed.

Key innovations include: (1) a counterweight recoil compensation system that maintains aircraft stability during firing, (2) integrated altitude and GPS-based safety lockouts preventing firing in restricted conditions, (3) automatic flight speed and altitude limiting when the projectile system is armed, (4) specialized mounting system distributing pneumatic system weight around the aircraft center of gravity, and (5) integrated fire control system interfacing with standard RC aircraft controllers.

An alternative embodiment allows a used to adjust the elevation of the firing system while maintaining the orientation of the drone in space and also allowing recoil compensation.

The system enables new applications in paintball gaming, security training, and recreational target practice while maintaining safety through multiple redundant control systems.

Terms and Definitions

CRCS: Counterweight recoil compensation system
PPLS: Pneumatic projectile launching subsystem
Static stability: A condition such that an object does not move when subjected to no forces except gravity.

BRIEF DESCRIPTION OF THE SEVERAL VIEWS OF THE DRAWINGS

To identify the discussion of any particular element or act easily, the most significant digit or digits in a reference number refer to the figure number in which that element is first introduced.

BRIEF DESCRIPTION OF THE DRAWINGS

Figure 1:
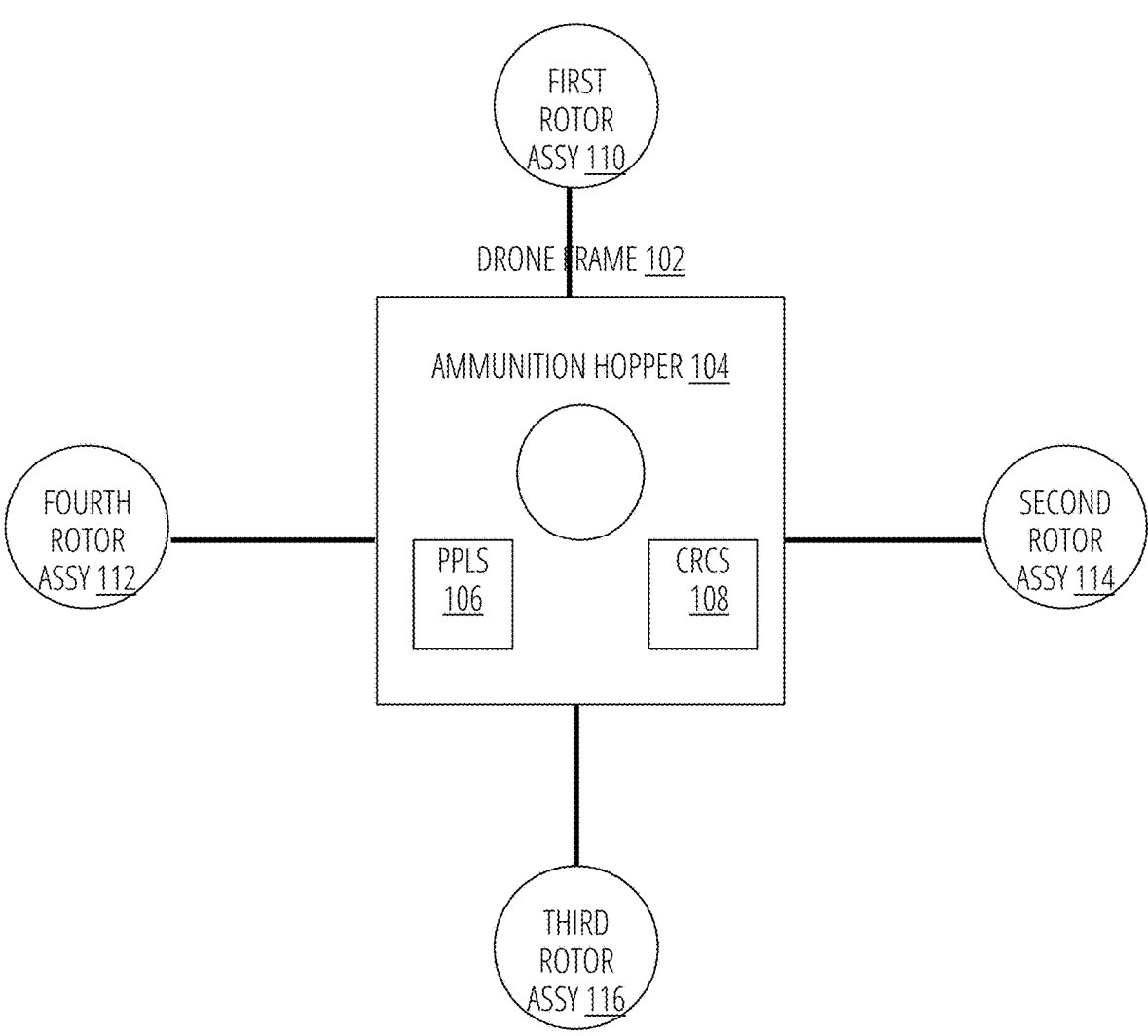

FIG. 1 shows a top plan view of the quadcopter with integrated paintball system, illustrating the overall layout and component positioning.

Figure 2:
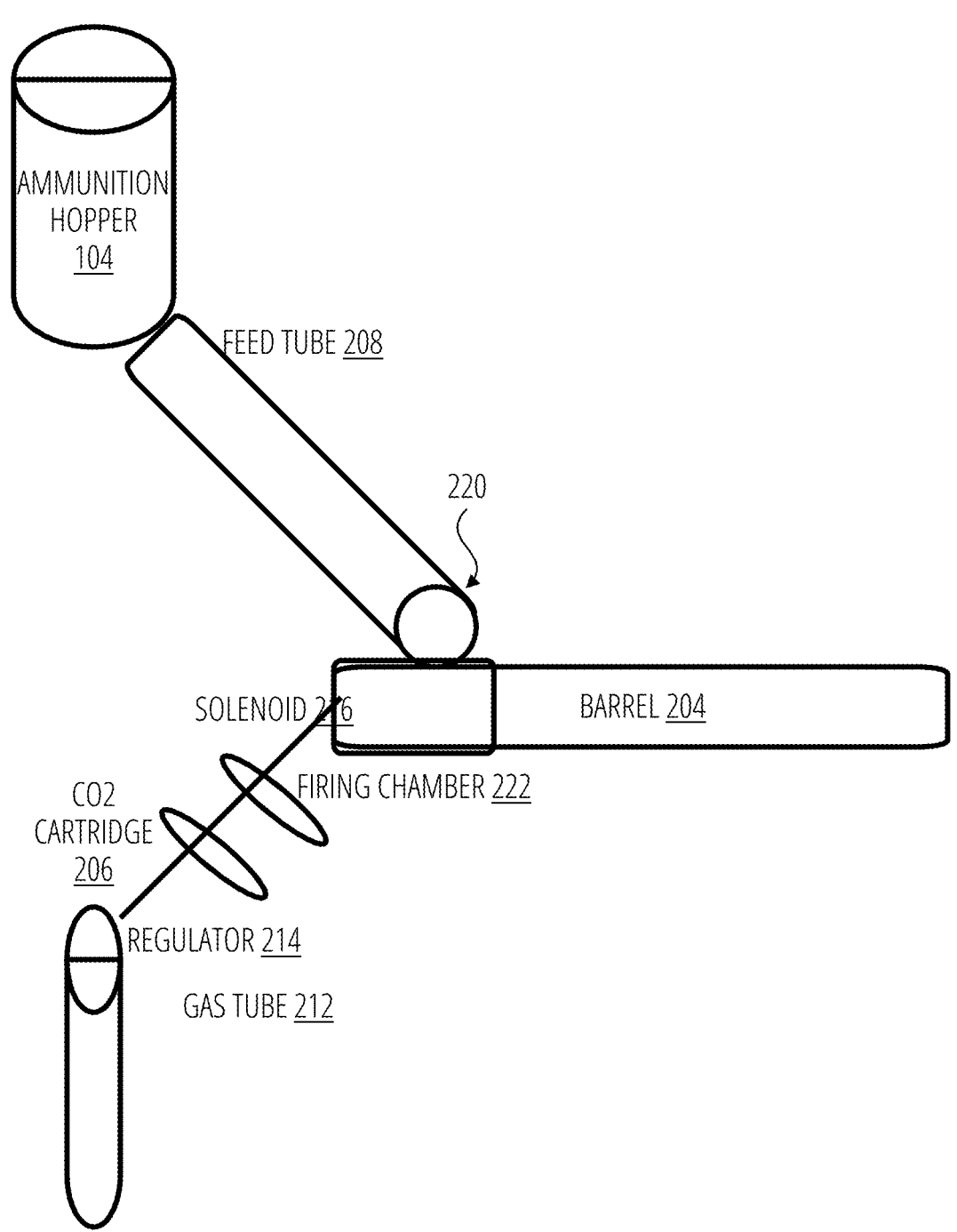

FIG. 2 shows a side elevation view of the aircraft, detailing the pneumatic system mounting and counterweight placement.

Figure 3:
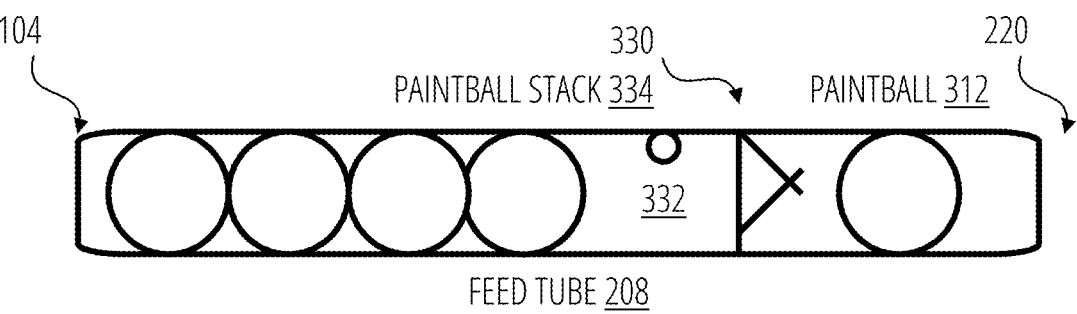

FIG. 3 shows a detailed cross-sectional view of the pneumatic firing mechanism and ammunition hopper assembly.

Figure 4:
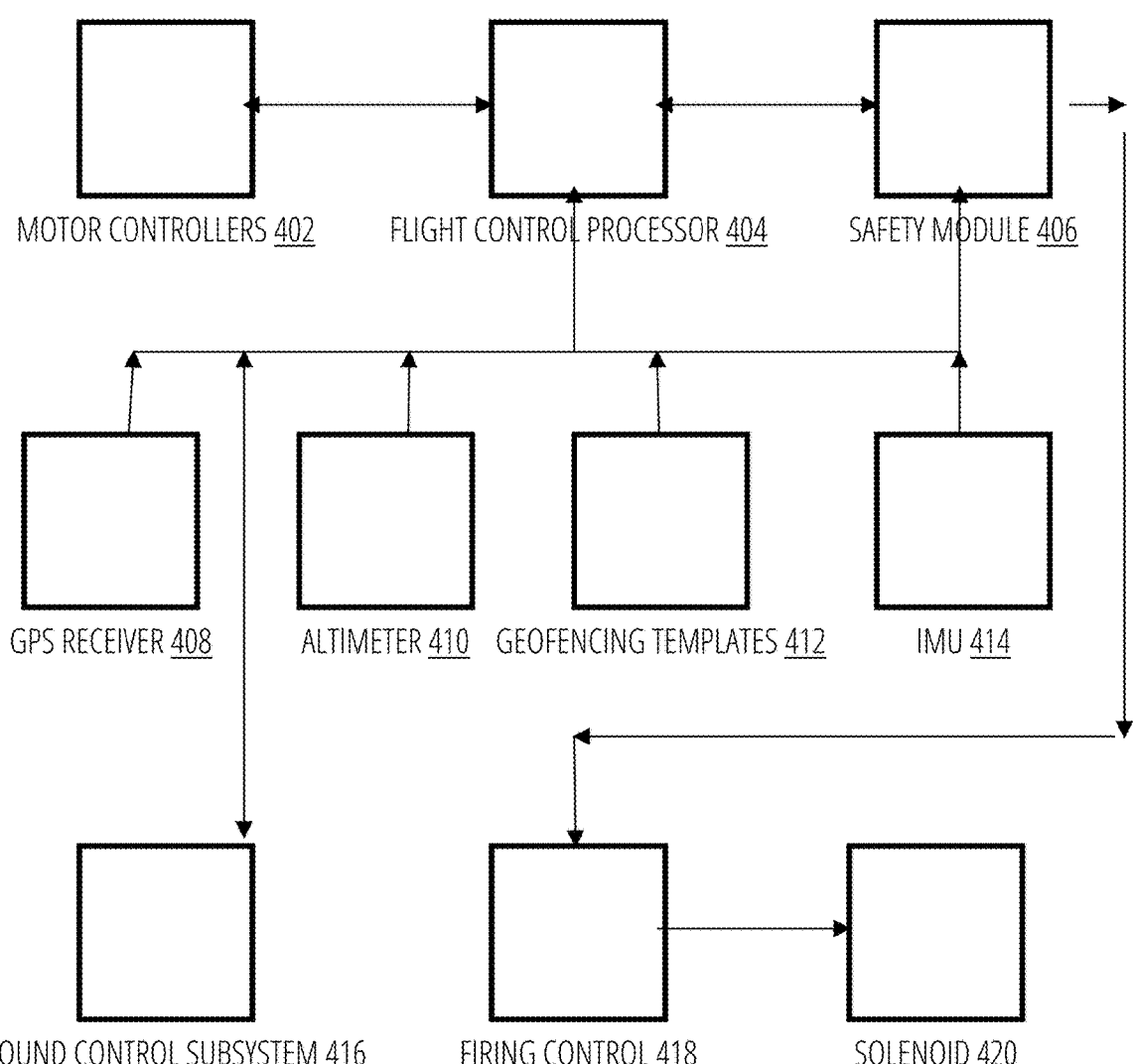

FIG. 4 shows a block diagram of the electronic control system integrating flight control, GPS, and firing mechanisms.

Figure 5:
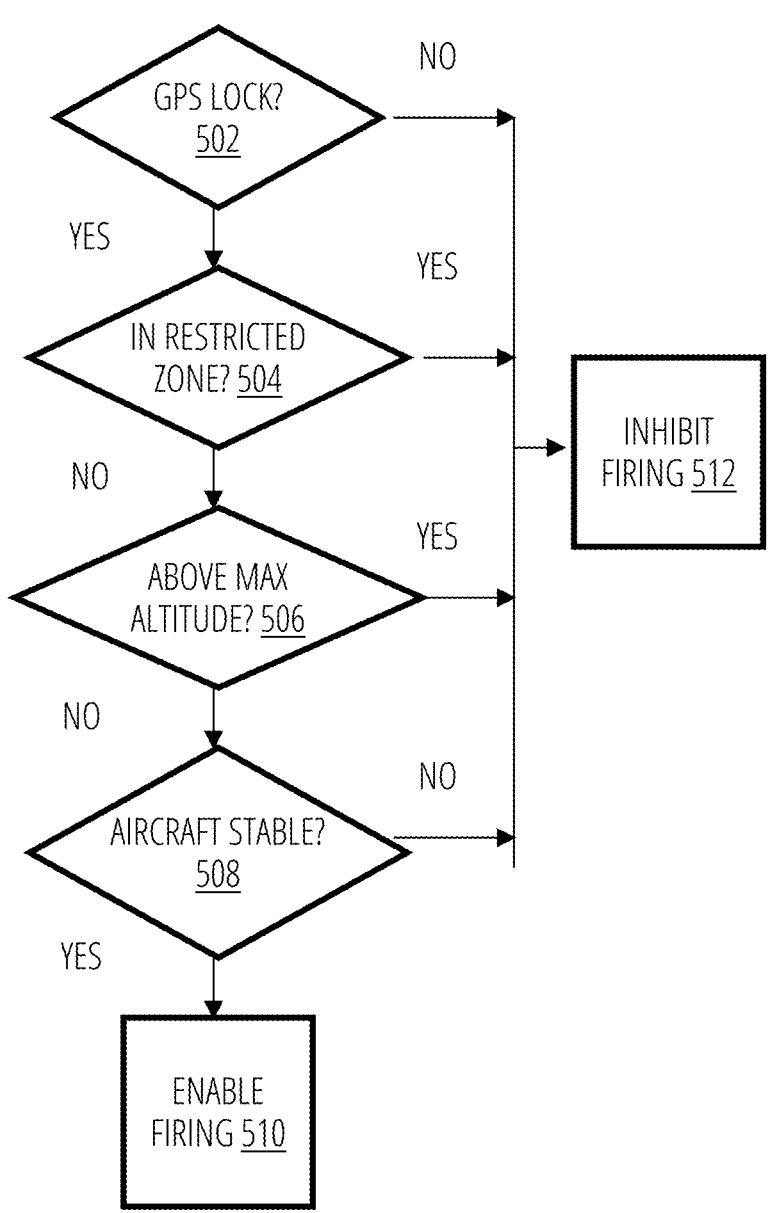

FIG. 5 shows a flowchart of the safety control algorithm including altitude and GPS-based lockouts.

Figure 6:
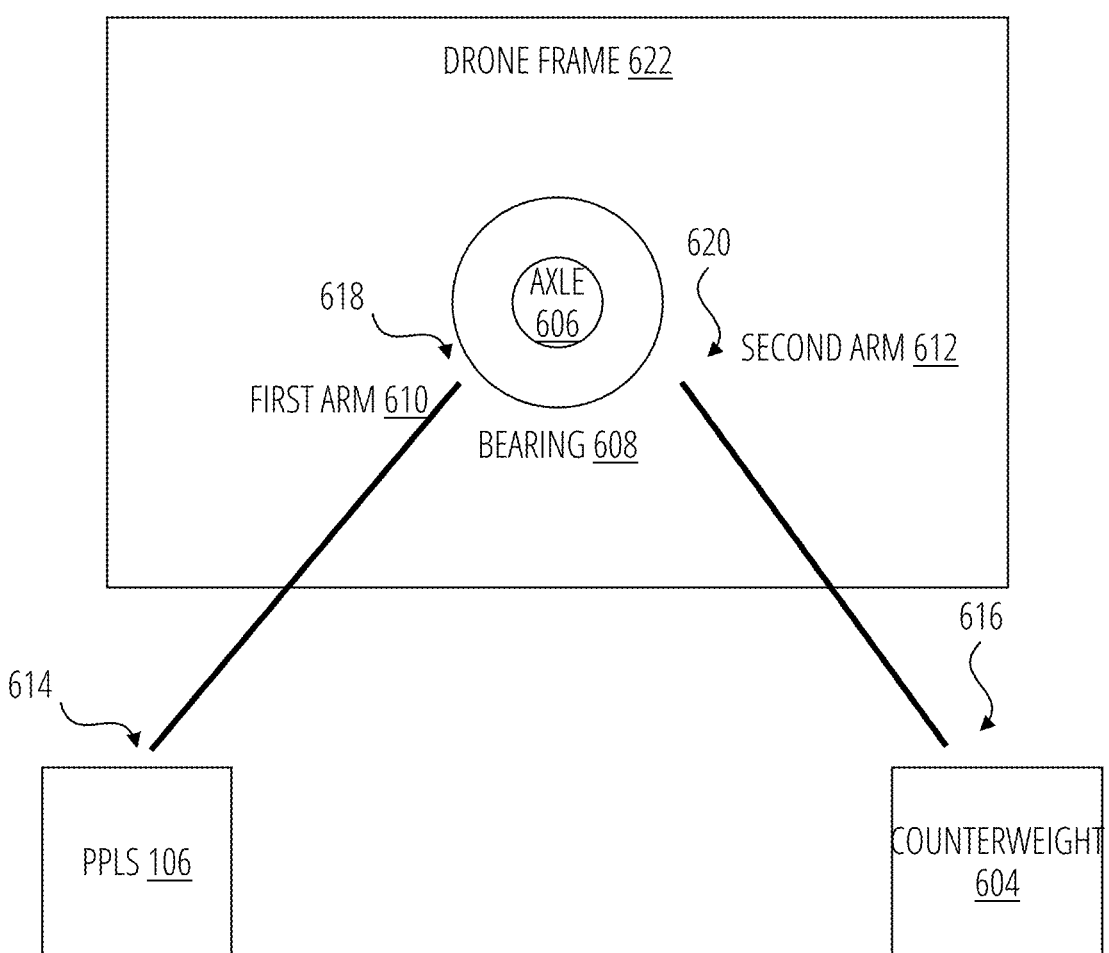

FIG. 6 shows the counterweight recoil compensation system in detail.

Figure 7:
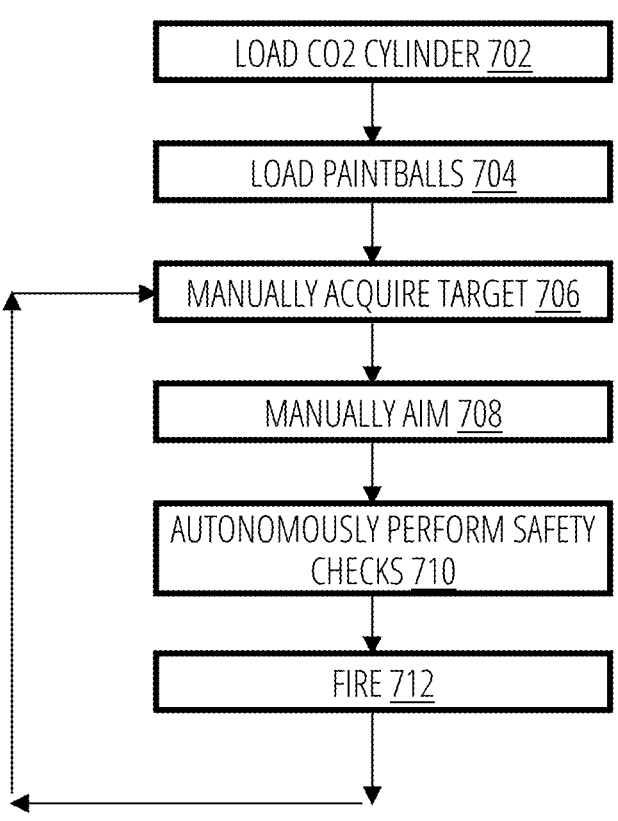

FIG. 7 shows the ground control interface with integrated firing controls and safety indicators.

FIG. 1 is a plan view of the overall system.

FIG. 2, shows details of the pneumatic projectile launching subsystem (PPLS).

FIG. 3 shows the paintballs in the feed tube with the roll and blowback inhibitor.

FIG. 4 is a block diagram showing the relationship among the subsystems.

FIG. 5 is a flow chart depicting the control and safety sequences.

FIG. 6 illustrates the counterweight recoil compensation system.

FIG. 7 is a flowchart depicting the operational sequence.

Figure 8:
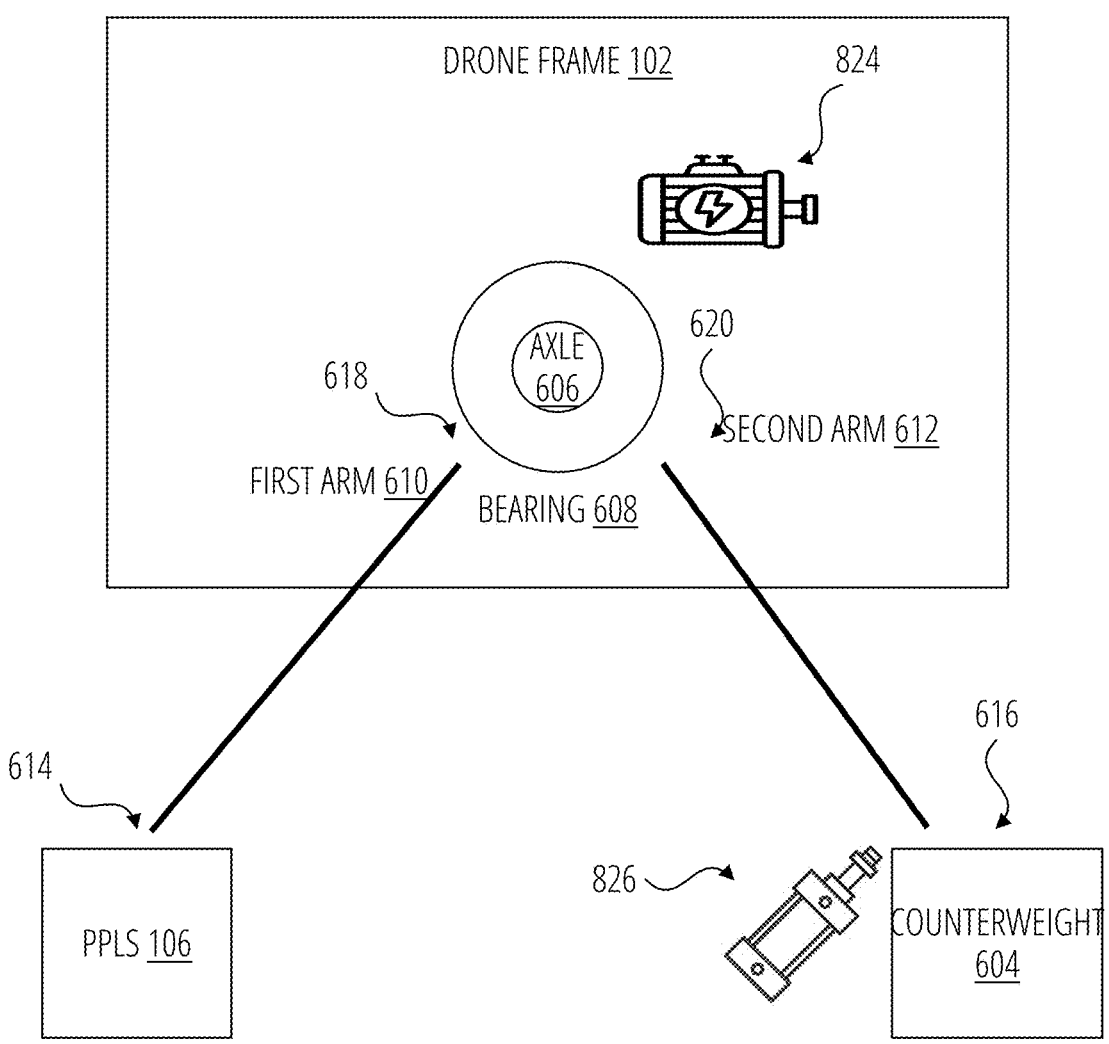

FIG. 8 illustrates the components of the elevation control subsystem.

Figure 9:
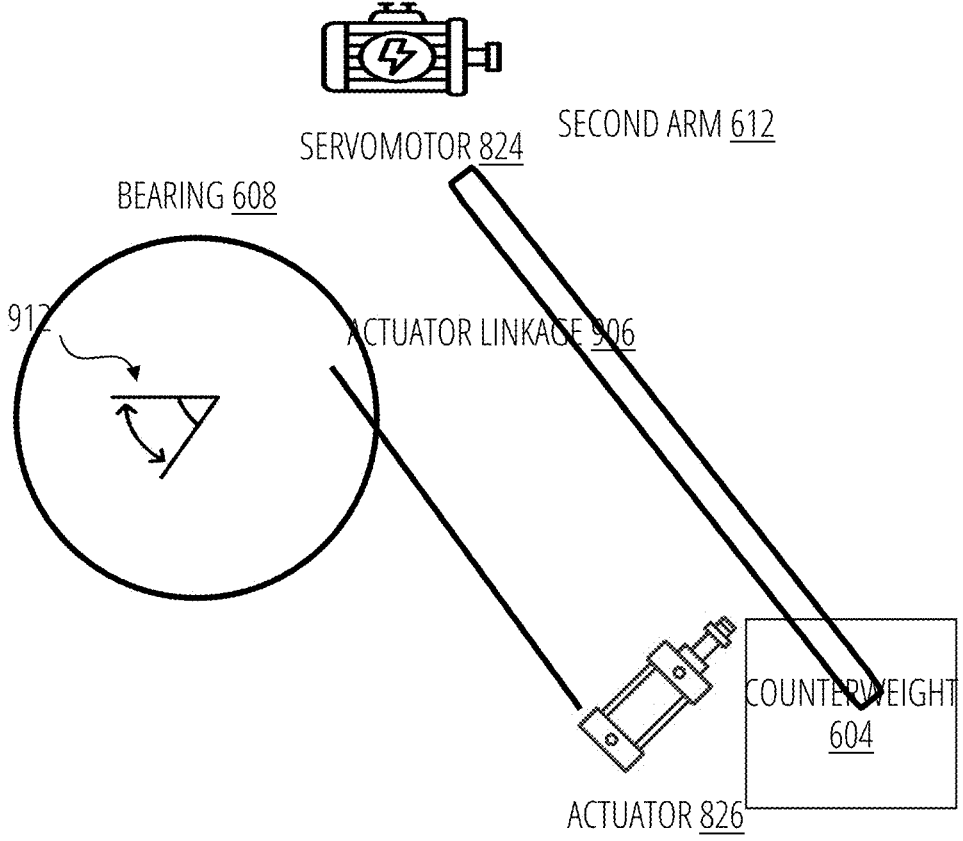

FIG. 9 illustrates how the counterweight recoil compensation system works with the elevation control subsystem.

Figure 10A:
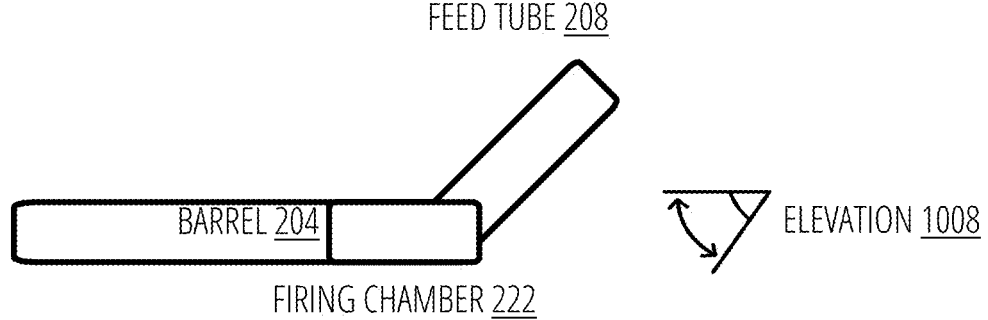

FIG. 10A illustrates gravity feed when the barrel is in the horizontal position.

Figure 10B:
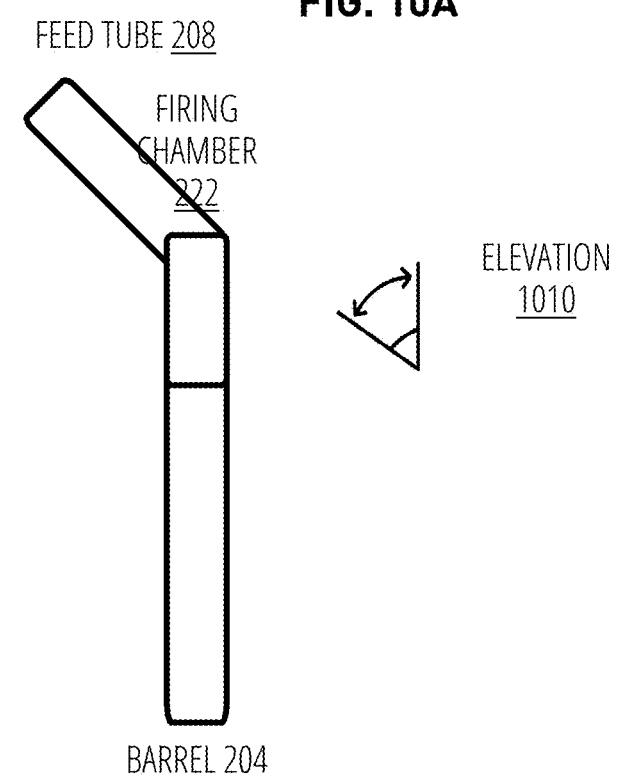

FIG. 10B illustrates gravity feed when the barrel is in the vertical position.

Figure 11:
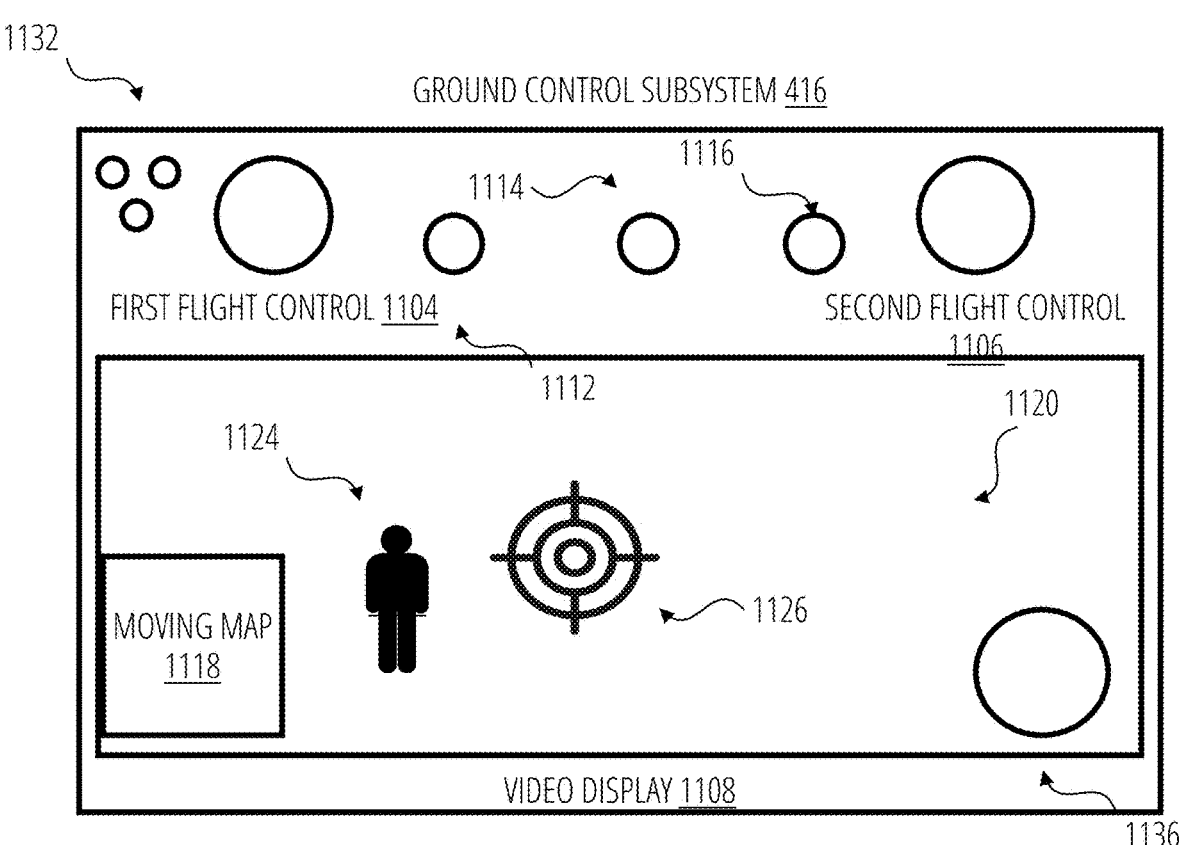

FIG. 11 illustrates the ground control system.

DETAILED DESCRIPTION OF THE INVENTION

Overall System Architecture

Referring to FIG. 1 and FIG. 2, the unmanned aerial vehicle system comprises a commercially available quadcopter aircraft platform as known in the art as a "drone." The drone frame 102 is a standard carbon fiber or aluminum construction supporting four rotor assemblies, a first rotor assy 110, a second rotor assy 114, a third rotor assy 116, and a fourth rotor assy 112, each comprising a rotor driven by commercially available brushless electric motor of the type commonly used in recreational and commercial UAV applications.

The drone frame 102 provides a central mounting platform for the pneumatic paintball projection subsystem (PPLS 106), which represents an inventive aspect of the present disclosure. The PPLS 106 includes a compressed gas supply (a $CO_2$ cartridge 206), an ammunition hopper 201, a feed tube 208, a firing chamber 222, a barrel 204, and counterweight recoil compensation system (CRCS 108), all specifically designed for integration with standard quadcopter platforms.

The electronic control system 30 integrates with commercially available flight control processors 32 such as those based on ArduPilot, PX4, or similar open-source flight control software. Standard components include GPS receiver 34 and altitude sensor 36 of types commonly found in commercial UAV systems, while the novel firing control circuit 38 provides the inventive integration between these standard components and the projectile system.
Pneumatic Projectile Launching Subsystem (PPLS)

The pneumatic projectile launching subsystem comprises an ammunition hopper 104, a barrel 204, a firing chamber

222, a $CO_2$ cartridge 206, a feed tube 208, a gas tube 212, a regulator 214, a solenoid 216, a 218, and an orifice 220.

The firing chamber 222 comprises a cylinder with a gas port at its proximal end and barrel fixedly connected to its distal end. The barrel 204 has a proximal end fixedly connected to the distal end of the firing chamber 222 through a tapered conical shape known as the orifice 220 and a distal end. The gas port is centered on the proximal end of the firing chamber. The firing chamber and the barrel have nearly equal diameters with the firing chamber diameter at least and not more than larger than the barrel diameter.

The ammunition hopper 104 hopper utilizes gravity-fed delivery to the firing chamber. The hopper holds up to twelve paintballs in a compact cylindrical configuration optimized for aircraft weight distribution.

The diameter of the firing chamber 222 (not less than 17.32 mm and not greater than 17.45 mm) is slightly larger than the diameter of the barrel 204 (not less than 17.31 mm and not greater than 17.43 mm). Firing chamber diameter is such as to allow gravity to cause the paintball to drop reliably into the firing chamber without undue friction or impediment and without breaking the paintball. The relationship between paintball diameter and the inner diameter of the barrel, however, is close in order to prevent gas from escaping around the paintball as it moves through the barrel. This relationship of diameters comprises a projectile deformation sealing mechanism wherein projectiles undergo controlled elastic deformation under firing pressures to reduce gas leakage clearance around the projectile circumference.

The clearance between the paintball and the inner surface of the barrel is no less than 0.005 mm and no greater than 0.2 mm. The clearance between the paintball and the inner surface of the firing chamber is no less than 0.005 mm and no greater than 0.2 mm. The clearance between the paintball and the inner surface of the orifice is no less than 0.005 mm and no greater than 0.2 mm.

Gravity causes a paintball to fall through the orifice 220 from the feed tube 208 into the firing chamber 222. When the operator commands the system to fire, the valve allows high-pressure gas to enter the firing chamber through the port behind the paintball. The pressure rise causes the paintball to exit the firing chamber and enter the barrel whereafter it continues to accelerate because of the force exerted by the gas pressure. Ultimately, the paintball exits the barrel at its distal end.

The electronic control subsystem comprising a firing control circuit configured to interface with the standard UAV flight control processors, GPS receivers, and altitude sensors.

The barrel 204 is sized for standard .68 caliber paintballs.

In one embodiment, the compressed gas supply comprises a replaceable $CO_2$ cartridge 206 connected via a pressure regulator 214 and solenoid 216 to the firing chamber 222.

The regulator 214 maintains consistent firing pressure between 150-200 PSI, optimized for safe projectile velocity while maintaining effectiveness at ranges of 25-40 feet.

The solenoid 216 provides rapid gas release for projectile acceleration while allowing precise electronic control from the firing control 418.

Commercial UAV Platform Integration

The present disclosure is designed for integration with commercially available quadcopter platforms having payload capacities of 500-1500 grams and flight times of 8-45 minutes. Representative suitable platforms include, but are not limited to, the DJI series, Autel EVO series, and custom platforms based on open-source flight control systems such as ArduPilot or PX4.

Standard quadcopter components utilized in the present system include:

Frame: Carbon fiber or aluminum quadcopter frame with 450-650 mm motor-to-motor spacing Motors: Brushless DC motors with 400-800 W power rating per motor Propellers: 10-15-inch diameter propellers appropriate for motor specifications Electronic Speed Controllers (ESCs): Standard 30-60A ESCs compatible with chosen motors Flight Control Unit: Commercial flight controller with integrated IMU, GPS, and barometric sensors Battery: Lithium polymer batteries with 4S-6S configuration and 3000-8000 mAh capacity Radio System: 2.4 GHz control system with standard RC protocols (PPM, SBUS, etc.)

These components are readily available from numerous manufacturers and represent established technology well-known to persons skilled in the UAV arts. The inventive aspects of the present disclosure lie in the specific integration of the paintball projectile system with such standard platforms, the novel recoil compensation mechanisms, the elevation adjustment mechanisms, and the specialized safety control systems that interface with standard UAV navigation components.

The paintball control system relies on sensors and logic supplied with the drone to determine position in space, altitude, and speed vehicle orientation.

Paintball Metering and Blowback-Prevention

FIG. 3 shows the paintball metering and blowback-prevention system. The ammunition hopper 104 is connected to the proximal end of the feed tube 208, which has an orifice 220 at its distal end, a single paintball 312 easily passes through a one-way check valve 330, which then prevents blowback up the feed tube when gas pressure rises upon firing. A relief hole 332 allows any residual gas bypassing the check valve to exit to the atmosphere to prevent ballooning of the paintball stack 334 in the ammunition hopper 104 and feed tube 208.

A soft split-diaphragm ("duckbill") feed gate and O-ring seal comprise the check valve in the ammunition feed path upstream from the firing chamber; This approach applies essentially zero cracking pressure, is gentle on paintballs, effects a fast reseal, and is tolerant of slight ball-size variance and shell tackiness. Two thin compliant elastomer lips shaped as a split diaphragm sit in the feed tube above the orifice. Gravity pushes a ball through; the lips flex open with almost no force. When the firing system vents gas, any reverse flow pushes the lips together, blocking blowback up the stack. The check valve with a cracking pressure of 2-4 PSI for forward projectile flow and sealing capability no less than 150 PSI and no greater than 250 PSI for reverse gas flow.

The blowback prevention system allows controlled elastic deformation of projectiles under firing pressure to reduce gas leakage clearance in the transition orifice, assuring gas leakage is less than 10% of forward gas flow.

During normal feeding operations, the gravitational force on paintballs (approximately 0.03N) combined with additional feeding forces easily exceeds the cracking pressure, allowing the check valve to open for paintball passage. The valve opening provides a clear passage area when fully open.

During firing operations, gas pressure attempting to flow backward through the feed tube encounters the check valve in its sealing orientation.

The check valve maintains its sealed position throughout the firing sequence, preventing essentially all backward gas flow through the feed tube.

The transition orifice 220 connecting the feed tube 208 to the firing chamber 222 provides the primary gas sealing mechanism. The orifice has an internal diameter of 18.0 mm±0.05 mm, while standard paintballs have a diameter of 17.3 mm±0.1 mm, creating a nominal radial clearance of 0.35 mm around the paintball circumference.

Under firing pressures of 150-200 PSI, the paintball undergoes controlled deformation due to its gelatin shell construction. The deformation increases the effective sealing diameter from 17.3 mm to 17.8-18.0 mm, substantially reducing the annular gap through which gas can escape. The deformation is elastic and temporary, with the paintball returning to its original shape upon pressure release.

The subsystem provides sealing capability above 150 PSI for reverse gas flow. At operating pressure of 175 PSI, the deformation sealing mechanism blocks 80-90% of potential backward gas flow, limiting leakage to approximately 0.3 g/s compared to the primary forward flow of 2.2 g/s.

The chamber pressure acts on the full rear surface of the paintball (~235 mm$^2$), while gas leakage acts around a small annular area (~38 mm$^2$). Forward force dominates.

In one embodiment, the orifice length of 20 mm provides adequate sealing contact area while allowing smooth paintball passage during normal feeding operations. The orifice surfaces have a finish of Ra 0.4 μm to minimize friction during paintball passage while providing effective sealing contact under pressure. The combination of projectile deformation sealing and one-way check valve provides redundant protection against gas backflow. Under normal operating conditions with both systems functional, backward gas leakage is limited to less than 5% of total gas flow, maintaining projectile muzzle velocities within ±2 m/s of nominal performance.

The deformation sealing mechanism is effective across the full range of paintball diameter tolerances (17.2 mm to 17.4 mm) commonly found in commercial paintball ammunition.

Electronic Control and Safety Subsystems

FIG. 4 is a block diagram of system control and safety systems. The flight control processor 404 controls drone attitude and flight by sending signals to the motor controllers 402. A safety module 406 receives signals from a GPS receiver 408, an altimeter 410, an inertial measurement unit (IMU 414), and a ground control subsystem 416, and applies geofencing templates 412 to inhibit or allow firing. When the safety module 406 allows firing a firing control 418 activates the solenoid 420 and admits gas to the firing chamber, behind the paintball 312.

The electronic control system integrates the novel firing control capabilities with commercially available UAV flight control systems. The standard flight control processor 404, such as those based on ArduPilot, PX4, or proprietary systems from manufacturers like DJI, manages conventional quadcopter flight functions while interfacing with the safety module 406.

The system utilizes standard GPS receiver 408 components commonly found in commercial UAVs to provide real-time positioning data to the geofencing templates 412, which comprise a database of restricted zones where firing is prohibited. These may include airports, schools, populated areas, and other sensitive locations programmed during system initialization.

Standard altimeter 410 components (typically barometric pressure sensors and/or GPS-based altitude) send altitude data to interface with an altitude routine in the safety module 406, preventing firing above predetermined altitude limits. The default maximum firing altitude is set at fifty feet above ground level, configurable by the operator within safety parameters.

The mounting and integration methods described herein are specifically designed to be compatible with the mechanical interfaces, electrical systems, and software protocols commonly found in commercial quadcopter platforms, enabling retrofitting of existing aircraft or integration during manufacturing of new platforms.

Safety Control Algorithm

FIG. 5 depicts the operation of the safety-control algorithm. The algorithm first verifies GPS lock 502 and checks the current position against geofencing templates 412. If the drone is within a restricted zone, the system inhibits firing 512. The algorithm then tests whether the drone is above maximum altitude?506. If it is, the system inhibits firing 512. Finally, the algorithm checks whether the drone is stable 508. by checking IMU 414 readings for excessive motion that could affect accuracy or safety. If it is not stable, the system inhibits firing 512. The safety control circuit is configured to prevent projectile firing based on GPS position and altitude data received from the standard UAV flight control subsystems.

A geofencing module comprises geofencing templates that prevent firing when the drone is within predetermined restricted zones. The system compares altitude data from the altimeter is analyzed to determine if drone altitude exceeds a predetermined maximum firing altitude threshold.

Only after passing all safety checks does the system enable firing 510, allowing trigger activation from the ground control subsystem 416.

When the projectile system is armed, the flight control system automatically modifies aircraft performance parameters for safety. Maximum airspeed is reduced from 40 mph to 15 mph to improve accuracy and reduce impact energy in case of collision.

Maximum altitude is limited to 100 feet above ground level when armed, with firing lockout above 50 feet. These parameters are adjustable through the ground control system within predetermined safety limits.

Although the example routine depicts a particular sequence of operations, the sequence may be altered without departing from the scope of the present disclosure. For example, some of the operations depicted may be performed in parallel or in a different sequence that does not materially affect the function of the routine. In other examples, different components of an example device or system that implements the routine may perform functions at substantially the same time or in a specific sequence.

Recoil Compensation Subsystem ("CRCS")

The control system of the drone is assisted when a projectile is fired by a Counterweight Recoil Compensation System ("CRCS"). In one embodiment, the CO2 cartridge 206 and pressure regulation hardware (regulator 214) are positioned on the opposite side of the aircraft center of gravity from the feed tube 208, firing chamber 222, and barrel 204. The CO2 cartridge 206 and regulation hardware (regulator 214) acting as the counterweight 604. Additional mass may be added to achieve precise moment balance. This embodiment maximizes use of existing system mass while requiring longer pneumatic routing with minimal pressure loss.

In an alternative embodiment, the CO2 cartridge 206 and regulator 214 remain co-located with the PPLS for optimal pneumatic efficiency. A separate dedicated counterweight 604 is positioned on the opposite side of the aircraft center of gravity, connected to the firing mechanism via mechanical linkage. Upon firing, recoil forces transmitted through the linkage cause the counterweight to displace in a direction opposite to the direction in the firing mechanism experiences recoil, resulting in balanced moments about the center of gravity.

Both embodiments operate in the vertical plane relative to the aircraft, with firing forces and counterweight compensation forces directed on the opposite side of the center of gravity. The mechanical linkage provides instantaneous force transmission without electronic delays, maintaining aircraft stability during the 10-15 millisecond firing event.

The CRCS is mechanically coupled to the projectile launching system. The CRCS comprises a moveable mass attached to a second arm that displaces in opposition to projectile firing recoil forces exerted through a first arm, said first and second arms being fixedly attached to each other at a bearing surrounding an axle The CRCS, shown in FIG. 6, comprises a linkage with a first arm 610 and a second arm 612, each having a distal end 614, 616 and a proximal end 618, 620. The proximal end 618 of the first arm and the proximal end 620 of the second arm are rigidly connected to a bearing 608, which is capable of rotating about an axle 606, fixed to the drone frame 622. The counterweight recoil compensation subsystem is mechanically coupled to the PPLS, using mass of system components as counterweight.

When the Pneumatic Projectile Launching System (PPLS 602) fires a projectile, the resulting force on the PPLS is transmitted to the first arm of the linkage at its first end, which results in a moment about the axle. The CRCS also comprises a movable mass—the counterweight 604—fixed to the first end of the second arm of the linkage. The mass of the counterweight and the length of the second arm of the linkage can be adjusted so that the angular inertia presented by the second arm at the axle is sufficient to absorb the angular momentum presented at the axle by the first arm. When the CRCS thus absorbs the force created by the firing of the PPLS, no force is imparted to the drone frame by the firing, thus not imposing stress on the drone's control subsystem.

Method of Use

FIG. 7 is a flowchart depicting a method of use. A user loads a CO2 cylinder 702 and loads paintballs 704. Then the user manually acquires a target 706 and manually aims 708 the drone at the target. The system then autonomously performs safety checks 710. If the safety checks are completed satisfactorily, the user fires 712 a paintball.

The system neutralizes firing recoil forces using a mechanical counterweight system to maintain aircraft stability, wherein the counterweight system operates in a vertical plane with recoil forces directed upward and compensation forces directed downward with respect to the drone, with the counterweight subsystem fixedly connected to the firing chamber fixedly connected to the barrel of a pneumatic projectile launching subsystem, together rotatable about an axis fixed to the drone.

Although the example routine depicts a particular sequence of operations, the sequence may be altered without departing from the scope of the present disclosure. For example, some of the operations depicted may be performed in parallel or in a different sequence that does not materially affect the function of the routine. In other examples, different components of an example device or system that implements the routine may perform functions at substantially the same time or in a specific sequence.

Aiming

Aiming the PPLS involves adjusting its azimuth myth and elevation. Azimuth easily can be adjusted by yawing the drone. Yawing an aircraft does not change its lift vector and therefore does not change its direction of flight or velocity. Adjusting elevation, by adjusting aircraft pitch, however, does change the lift vector and thus flightpath and velocity, causing the drone to fly forward and faster as the nose is lowered and slower or backwards as the nose is raised.

In one embodiment, a user aims the PPLS by aiming the aircraft. This is the same technique used for more than one-hundred years by pilots of fighter aircraft, which usually have their guns attached in a fixed position with respect to the aircraft. In this embodiment, the user positions the PPLS so that a paintball hits the target by yawing the aircraft and raising or lowering its nose to align the barrel with a trajectory that intersects the target, after applying suitable corrections for wind, drone velocity, and projectile drop. When the lowered nose brings the drone too close to the ground, the user breaks off the firing run and maneuvers for another pass.

An alternative embodiment, depicted in FIG. 8, comprises a drone frame 102, a counterweight 604, an axle 606, a bearing 608, a second arm 612, a distal end 614, a distal end 616, a proximal end 818, a proximal end 820, a servomotor 824, and an actuator 826. In this embodiment, as in the first, the Counterweight Recoil Compensation System ("CRCS") is mechanically coupled to the projectile launching system. The CRCS comprises a linkage with the first arm 610 and the second arm 612, each having a distal end 614, 616 and a proximal end 618, 620. The proximal end 618 of the first arm and the proximal end 618 of the second arm are rigidly connected to a bearing 608, which is capable of rotating about an axle 606, fixed to the drone frame 822. The PPLS 602 is attached to the drone via a movable linkage actuated by a servomotor 824, configured to tilt the PPLS 602 with respect to the drone. This linkage provides for rotation of the PPLS 602 in a plane perpendicular to the aircraft's longitudinal axis, thus controlling elevation of the PPLS 602 with respect to the drone. In this embodiment, as in the first embodiment, the counterweight 604 is fixed to the PPLS 602 and tilts as the servomotor 824 changes the angle of the PPLS 602. An actuator 826 coupled to the servomotor 824 adjusts the position of the counterweight 604 on its leg of the lever, according to the elevation, so that the static moment about the axle is zero before firing. The pivot bearing assembly provides a horizontal rotation axis perpendicular to the drone longitudinal axis, permitting a servo arm connected between the servo motor output shaft and the pneumatic projectile launching subsystem to rotate the PPLS, and has position feedback sensors providing elevation angle information, and mechanical stops limiting elevation travel to prevent over-rotation, beyond 90 degrees in one embodiment.

In this alternative embodiment, the ground display shows a bull's-eye that changes its position with respect to the displayed target, as the drone attitude and elevation of the PPLS with respect to the drone change. As with the first embodiment, the user controls azimuth by yawing the drone.

In this alternative elevation-controlled projectile subsystem, when the Pneumatic Projectile Launching System ("PPLS 802") fires a projectile, the resulting force on the PPLS is transmitted to the first arm of the linkage at its first end, which results in a moment about the axle. When the CRCS thus absorbs the force created by the firing of the PPLS, no force or moment is imparted to the drone frame by the firing, thus not imposing stress on the drone's control subsystem.

Use of the elevation-controlled projectile subsystem comprises:

commanding a servomotor to position the pneumatic projectile launching subsystem at the calculated elevation angle;

automatically positioning the counterweight assembly to provide optimal recoil compensation for the selected elevation angle;

verifying elevation angle is within safety parameters based on aircraft altitude and GPS position;

enabling projectile firing only when elevation positioning and safety checks are complete; and returning the elevation-controlled projectile subsystem to neutral position after firing sequence completion.

FIG. 9 shows how the servomotor 824, adjusts the elevation angle 912 by exerting a force on the circumference of the bearing 608, while the same time transmitting a corresponding force through the actuator linkage 906 to the actuator 826, which adjusts the position of the counterweight 604 on the second arm 612. As the servomotor adjusts the elevation of the PPLS, it simultaneously adjusts the position of the counterweight mass on the second arm to maintain static stability.

In an alternative embodiment, control software and hardware provide pulse-width modulation control signals to the servomotor, obtain position data from rotary encoders or potentiometers attached to the bearing and the second arm; and prevent elevation adjustment during firing sequences.

At the completion of the firing sequence, the elevation-controlled projectile subsystem returns to a statically stable position.

Gravity feed still works in this embodiment as the PPLS elevation 1008 and 1010 changes with respect to the drone frame. FIG. 10A and FIG. 10B show how positioning the feed tube at a fixed 450 angle with respect to the firing chamber allows gravity to pull the next paintball into the firing chamber as the PPLS is rotated from a firing angle—an elevation 1008 of 90°, at which the barrel 204 is horizontal, to a firing angle—an elevation 1010 of 0°, at which the barrel 204 is vertical. The feed tube 208, attached to the barrel 204, moves through an angle of 90°, but its initial 450 position with respect to the PPLS means that gravity continues to exert a force on the paintballs in the feed tube pulling them toward the firing chamber 222

FIG. 10A shows the system at an elevation 1008 of 90 degrees.

FIG. 10B shows the system at an elevation 1010 of 0 degrees.

Ground Control Subsystem

FIG. 11 depict one embodiment of the ground electronic control subsystem 1102. This subsystem integrates standard RC aircraft controls with specialized paintball firing controls. The subsystem includes standard flight control sticks: a first flight control 1104, typically used to control ascent, descent, and direction of flight, and a second flight control 1106, typically used to control yaw and velocity, and switches, including but not limited to a launch/land 1112 button and a power on/off 1116 button, supplemented with a fire 1114 trigger.

Indicator lights 1132 provide visual feedback for system status including armed/disarmed status, GPS lock, altitude restrictions, and ammunition count. An emergency stop 1136 button provides immediate firing system disarm and optional aircraft emergency landing sequences.

A video display 1108 comprises a moving map 1118, and a video feed 1120. The video feed 1120 displays a target 1124, a bullseye 1126 to permit a user to aim the drone and its PPLS, and a plurality of system data, such as altitude, distance from home, ammunition counter, speed, spatial position, and orientation.

The ground control subsystem 416 also comprises an emergency stop features, enabling the user to cause the drone to land immediately, or, at the option of the user, to interrupt electrical power to its rotor assemblies.

The ground control subsystem 416 transmits electrical signals wirelessly to the drone, comprising commands, and receives telemetry data wirelessly from the drone.

The disclosure offers a relatively inexpensive paintball system for recreational users, for training military and law enforcement personnel on operational drones and for marking suspects for later arrest or interrogation in the context of crowd control, robberies, or other hot pursuits. The disclosure overcomes many of the limitations of present paintball systems, which are limited to ground-based use.

I claim:

1. An unmanned aerial vehicle system, comprising:
a commercially available drone comprising:
a quadcopter aircraft frame supporting four rotor assemblies with associated motors and flight control systems as known in the art;
standard UAV flight control processors, GPS receivers, and altitude sensors;
a pneumatic projectile launching subsystem (PPLS) mounted to the aircraft frame, the subsystem comprising:
an ammunition storage hopper;
an ammunition feed subsystem;
a compressed gas supply;
a feed tube;
a firing chamber;
a pressure regulator;
a solenoid valve;
a gas tube;
a barrel; and
an orifice connecting the feed tube to the firing chamber; and
a gas flow control subsystem preventing backward gas flow through the ammunition feed subsystem, the gas flow control subsystem, comprising a projectile deformation sealing mechanism wherein projectiles undergo controlled elastic deformation under firing pressures to reduce gas leakage clearance around the projectile circumference;
a counterweight recoil compensation subsystem mechanically coupled to the PPLS using mass of system components as counterweight;
an electronic control subsystem comprising a firing control circuit configured to interface with the standard UAV flight control processors, GPS receivers, and altitude sensors;
a safety control circuit configured to prevent projectile firing based on GPS position and altitude data received from the standard UAV flight control subsystems; and
a ground control subsystem.

2. The system of claim 1, further comprising:
a soft, split-diaphragm feed gate and O-ring seal located upstream from the firing chamber; and
a relief hole upstream of the feed gate.

3. The system of claim 1, wherein the counterweight recoil compensation subsystem comprises a moveable mass attached to a second arm that displaces in opposition to projectile firing recoil forces exerted through a first arm, said first and second arms being fixedly attached to each other at a bearing surrounding an axle.

4. The system of claim 3, wherein the counterweight recoil compensation subsystem comprises the compressed gas supply as the counterweight mass positioned on an opposite side of the drone center of gravity from the projectile launching subsystem.

5. The system of claim 1, wherein the safety control circuit comprises a geofencing module that prevents firing when the drone is within predetermined restricted zones.

6. The system of claim 1, wherein the safety control circuit prevents firing when the drone altitude exceeds a predetermined maximum firing altitude.

7. The system of claim 6, wherein the predetermined maximum firing altitude is 50 feet above ground level.

8. The system of claim 1, wherein the electronic control subsystem automatically reduces maximum aircraft speed when the PPLS is armed.

9. The system of claim 1, wherein the ammunition storage hopper has a capacity of twelve paintballs and utilizes gravity-fed delivery to the firing chamber.

10. The system of claim 1, further comprising a ground control subsystem with integrated firing controls, safety indicators, and emergency stop capability.

11. The system of claim 1, also comprising an elevation control subsystem comprising:
a pivot bearing assembly providing a horizontal rotation axis perpendicular to the drone longitudinal axis;
a servo arm connected between the servo motor output shaft and the pneumatic projectile launching subsystem;
position feedback sensors providing elevation angle information; and
mechanical stops limiting elevation travel to prevent rotation beyond 90 degrees.

12. The system of claim 3, wherein the counterweight recoil compensation subsystem also comprises:
a servomotor connected to a bearing;
a linkage connecting the servomotor to an actuator through an actuator linkage; and
wherein the servomotor adjusts the elevation of the PPLS and simultaneously adjusts the position of the counterweight mass on the second arm to maintain static stability.

13. The system of claim 11, wherein control software and hardware:
provide pulse-width modulation control signals to the servomotor;
obtain position data from rotary encoders or potentiometers attached to the bearing and the second arm; and
prevent elevation adjustment during firing sequences.

14. A method of operating a drone with an integrated projectile system safely, comprising:
allowing gravity to cause a paintball to drop from an ammunition hopper through a feed tube into a firing chamber fixedly connected to a barrel of a pneumatic projectile launching subsystem;

providing a transition orifice having an internal diameter larger than the nominal projectile diameter;

allowing controlled elastic deformation of projectiles under firing pressure to reduce gas leakage clearance in the transition orifice;

positioning a one-way check valve in the ammunition feed path upstream from the firing chamber;

configuring the check valve with a cracking pressure of 2-4 PSI for forward projectile flow and sealing capability above 150 PSI for reverse gas flow; and integrating both sealing mechanisms to limit total backward gas leakage to less than 10% of forward gas flow;

receiving GPS position data and altitude data from the drone;

comparing the GPS position data against a database of restricted firing zones;

comparing the altitude data against a maximum firing altitude threshold;

enabling projectile firing only when the drone is outside restricted zones and below the maximum firing altitude;

automatically modifying flight parameters to reduce maximum speed and altitude when the PPLS is armed;

receiving an electrical signal transmitted wirelessly from a ground control system;

causing the electrical signal to activate a solenoid connected to a valve;

causing the valve to release gas from a compressed gas cartridge;

the increased gas pressure in the firing chamber causing the paintball to be expelled from the barrel.

15. The method of claim 14, further comprising neutralizing firing recoil forces using a mechanical counterweight subsystem to maintain aircraft stability, wherein the counterweight subsystem operates in a vertical plane with recoil forces directed upward and compensation forces directed downward.

16. The method of claim 14, wherein the maximum firing altitude threshold is 50 feet above ground level.

17. The method of claim 14, further comprising providing visual and audio data feedback to an operator on a ground control system indicating armed/disarmed status and safety subsystem states.

18. The method of claim 14, further comprising an elevation-controlled projectile subsystem comprising:

commanding a servomotor to position the pneumatic projectile launching subsystem at the calculated elevation angle;

automatically positioning the counterweight assembly to provide optimal recoil compensation for the selected elevation angle;

verifying elevation angle is within safety parameters based on aircraft altitude and GPS position;

enabling projectile firing only when elevation positioning and safety checks are complete; and returning the elevation-controlled projectile subsystem to a statically stable position after firing sequence completion.

*     *     *     *     *